(12) United States Patent
Mose et al.

(10) Patent No.: US 7,609,683 B2
(45) Date of Patent: Oct. 27, 2009

(54) COMMUNICATION SYSTEM, CONNECTION MANAGEMENT SERVER APPARATUS, AND RECORDING MEDIUM ON WHICH PROGRAM IS RECORDED

(75) Inventors: Kazuhiro Mose, Tokyo (JP); Masayuki Yamada, Tokyo (JP); Kazuhiko Azuma, Tokyo (JP); Toshikazu Maruyama, Tokyo (JP)

(73) Assignee: NEC Corporation, Tokyo (JP)

( * ) Notice: Subject to any disclaimer, the term of this patent is extended or adjusted under 35 U.S.C. 154(b) by 1060 days.

(21) Appl. No.: 10/420,762

(22) Filed: Apr. 23, 2003

(65) Prior Publication Data
US 2004/0028036 A1 Feb. 12, 2004

(30) Foreign Application Priority Data
Apr. 24, 2002 (JP) ............................. 2002-122336

(51) Int. Cl.
*H04L 12/66* (2006.01)
(52) U.S. Cl. ..................... 370/352; 370/351; 370/353; 370/354; 370/355; 370/356; 370/420
(58) Field of Classification Search ................ 370/230, 370/238, 351–356, 395.2, 402, 401, 468, 370/420
See application file for complete search history.

(56) References Cited

U.S. PATENT DOCUMENTS

| | | | | |
|---|---|---|---|---|
| 5,448,567 A * | 9/1995 | Dighe et al. | ................ | 370/233 |
| 5,586,121 A * | 12/1996 | Moura et al. | ................ | 370/404 |
| 6,490,273 B1 * | 12/2002 | DeNap et al. | ............... | 370/352 |
| 6,529,499 B1 * | 3/2003 | Doshi et al. | ................. | 370/352 |
| 6,643,262 B1 * | 11/2003 | Larsson et al. | ............. | 370/236 |
| 6,747,952 B1 * | 6/2004 | Heiss | .......................... | 370/235 |
| 2001/0005372 A1 * | 6/2001 | Cave et al. | .................. | 370/401 |
| 2003/0043787 A1 * | 3/2003 | Emerson, III | ............... | 370/352 |
| 2003/0091026 A1 * | 5/2003 | Penfield et al. | ............. | 370/352 |
| 2004/0174879 A1 * | 9/2004 | Basso et al. | ................. | 370/392 |

FOREIGN PATENT DOCUMENTS

| | | |
|---|---|---|
| JP | 11-112503 | 4/1999 |
| JP | 2000-78190 | 3/2000 |
| JP | 2001-217898 | 8/2001 |
| JP | 2002-10341 | 1/2002 |
| JP | 2004-266610 | 9/2004 |

OTHER PUBLICATIONS

MITF Dial Up Dormant Protocol, ARIB Standard, Association of Radio Industries and Businesses, Ver. 1.0, issued Jul. 27, 2001.

* cited by examiner

*Primary Examiner*—William Trost, IV
*Assistant Examiner*—Toan D Nguyen
(74) *Attorney, Agent, or Firm*—Dickstein Shapiro LLP

(57) ABSTRACT

A connection management server apparatus is arranged for the plurality of data link activated side apparatuses to systematically manage information of logical link resources to be used to connect the Internet. When a data link activating side apparatus newly calls a data link activated side apparatus, the connection management server apparatus provides information that represents a free logical link resource and a data link activated side apparatus having the logical link resource to the data link activated side apparatus that is newly called.

16 Claims, 10 Drawing Sheets

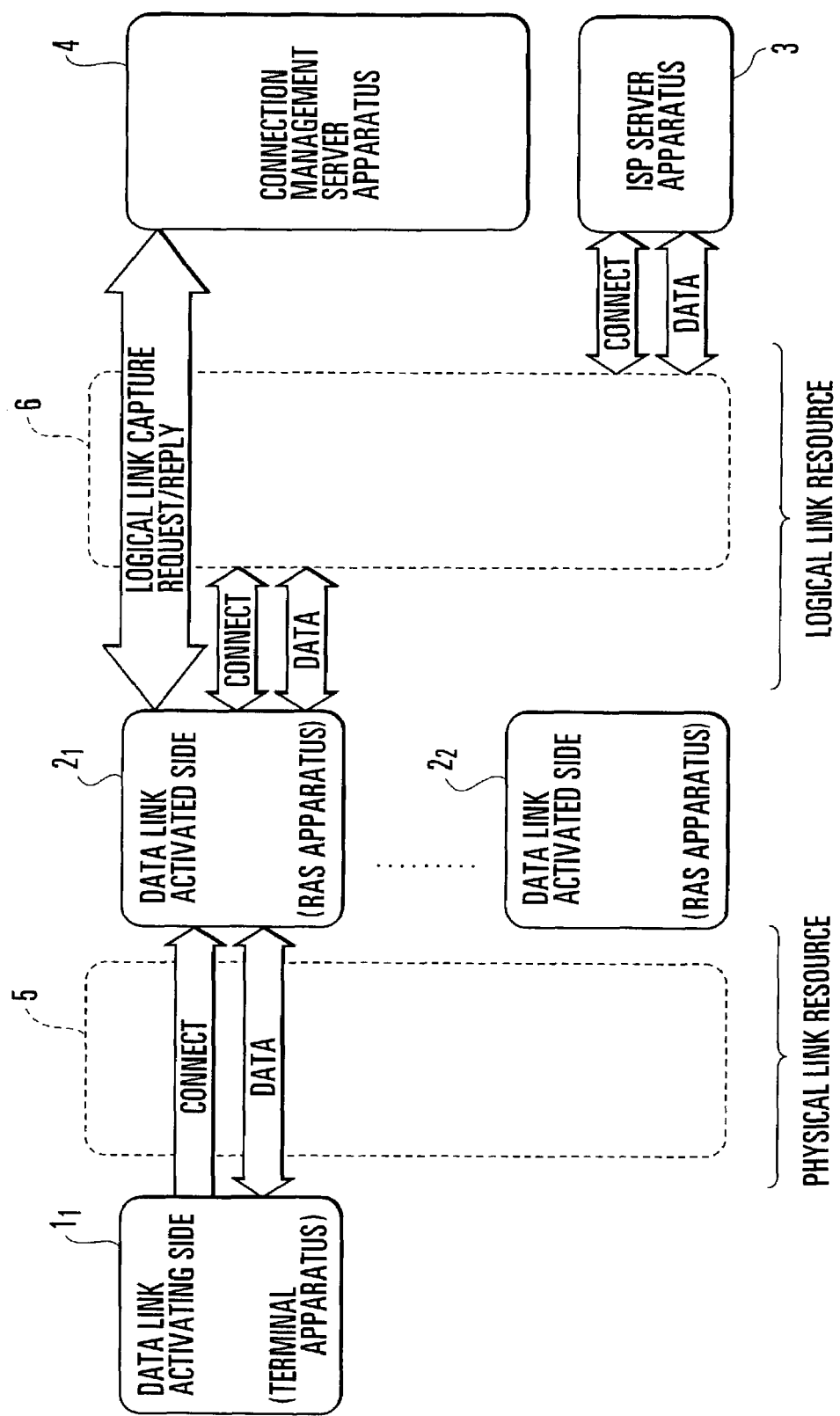
F I G. 5

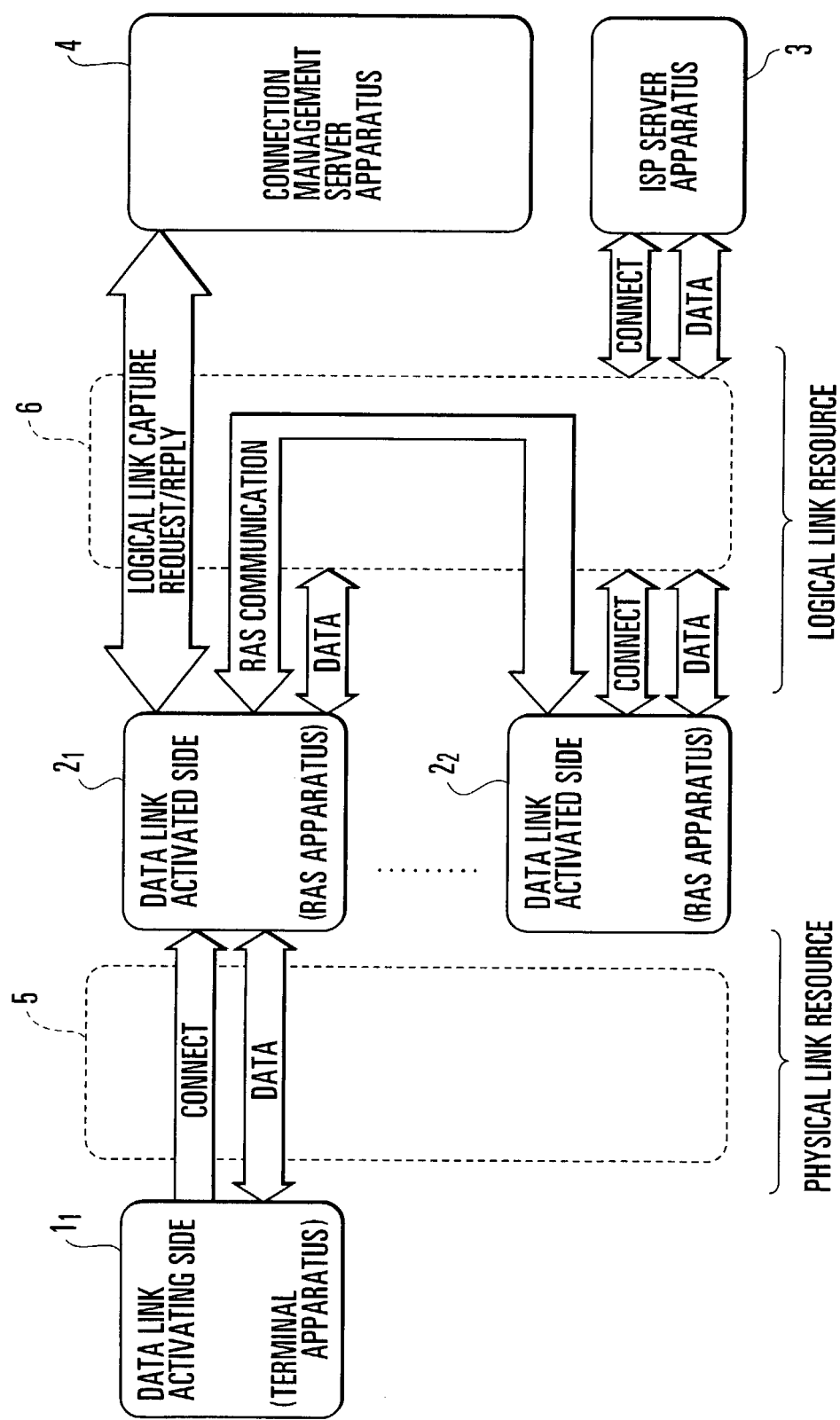
F I G . 6

COMMUNICATION SYSTEM, CONNECTION MANAGEMENT SERVER APPARATUS, AND RECORDING MEDIUM ON WHICH PROGRAM IS RECORDED

BACKGROUND OF THE INVENTION

The present invention relates to a communication system and connection management server apparatus, which have a dormant management function.

Along with the recent abrupt increase in use of the Internet, such a problem is posed that a dialup connection service cannot be provided because of a shortage of connection capacity of an existing remote access server apparatus (to be referred to as an RAS (Remote Access Server) apparatus hereinafter).

To cope with this problem, a communication system having a dormant function has been proposed, which disconnects a line to a data link activated side apparatus (RAS apparatus) when the operation of the terminal apparatus, i.e., the data link activating side apparatus of the user who uses the Internet is in a sleep mode (this state will be referred to as a dormant state hereinafter) and reconnects the line to the data link activated side apparatus when the data link activating side apparatus resumes the operation (active state).

The dormant function is implemented in accordance with, e.g., MITF (Mobile Internet Access Forum) dialup dormant protocol (ARIB (Association of Radio Industries and Businesses) STD-T78 version 1.0).

In a communication system which employs the above-described MITF dialup dormant protocol, since the resource (to be referred to as a physical resource hereinafter) of a circuit switched network for a given call in a dormant state is released, the problem of the shortage of connection capacity of a RAS apparatus is solved.

However, according to ARIB STD-T78, even in the dormant state, the Internet resource (to be referred to as a logical link resource hereinafter) of the RAS apparatus, which is used to connect the RAS apparatus to a Web server apparatus or Mail server apparatus managed by an ISP (Internet Service Provider), is held without being released. For this reason, if a number of calls in the dormant state are present, a shortage of logical link resource may occur for a new call, resulting in a call loss.

SUMMARY OF THE INVENTION

It is an object of the present invention to provide a communication system and connection management server apparatus which have a dormant management function capable of reducing call loss occurrence due to a shortage of a logical link resource.

In order to achieve the above object, according to the present invention, there is provided a communication system comprising a plurality of data link activating side apparatuses which use Internet, a plurality of data link activated side apparatuses which are connected to the data link activating side apparatuses through a circuit switched network to relay data to be transmitted/received between the data link activating side apparatuses and the Internet, and a connection management server apparatus which is arranged for the plurality of data link activated side apparatuses to systematically manage information of logical link resources to be used to connect the Internet, and when one of the data link activating side apparatuses newly calls one of the data link activated side apparatuses, provides information that represents a free logical link resource and a data link activated side apparatus having the logical link resource to the data link activated side apparatus that is newly called.

BRIEF DESCRIPTION OF THE DRAWINGS

FIG. 5 is a schematic view showing the operation of the communication system when a terminal apparatus shown in FIG. 1 is newly connected to the RAS apparatus, and no RAS communication is executed;

FIG. 6 is a schematic view showing the operation of the communication system when the terminal apparatus shown in FIG. 1 is newly connected to the RAS apparatus, and RAS communication is executed;

DESCRIPTION OF THE PREFERRED EMBODIMENT

The present invention will be described next with reference to the accompanying drawings.

A communication system according to this embodiment has a plurality of RAS apparatuses and a connection management server apparatus which systematically manages the logical link resources of the RAS apparatuses. The communication system is designed to cause the connection management server apparatus to control capture, search, and release of the logical link resource of each RAS apparatus.

Figure 1:
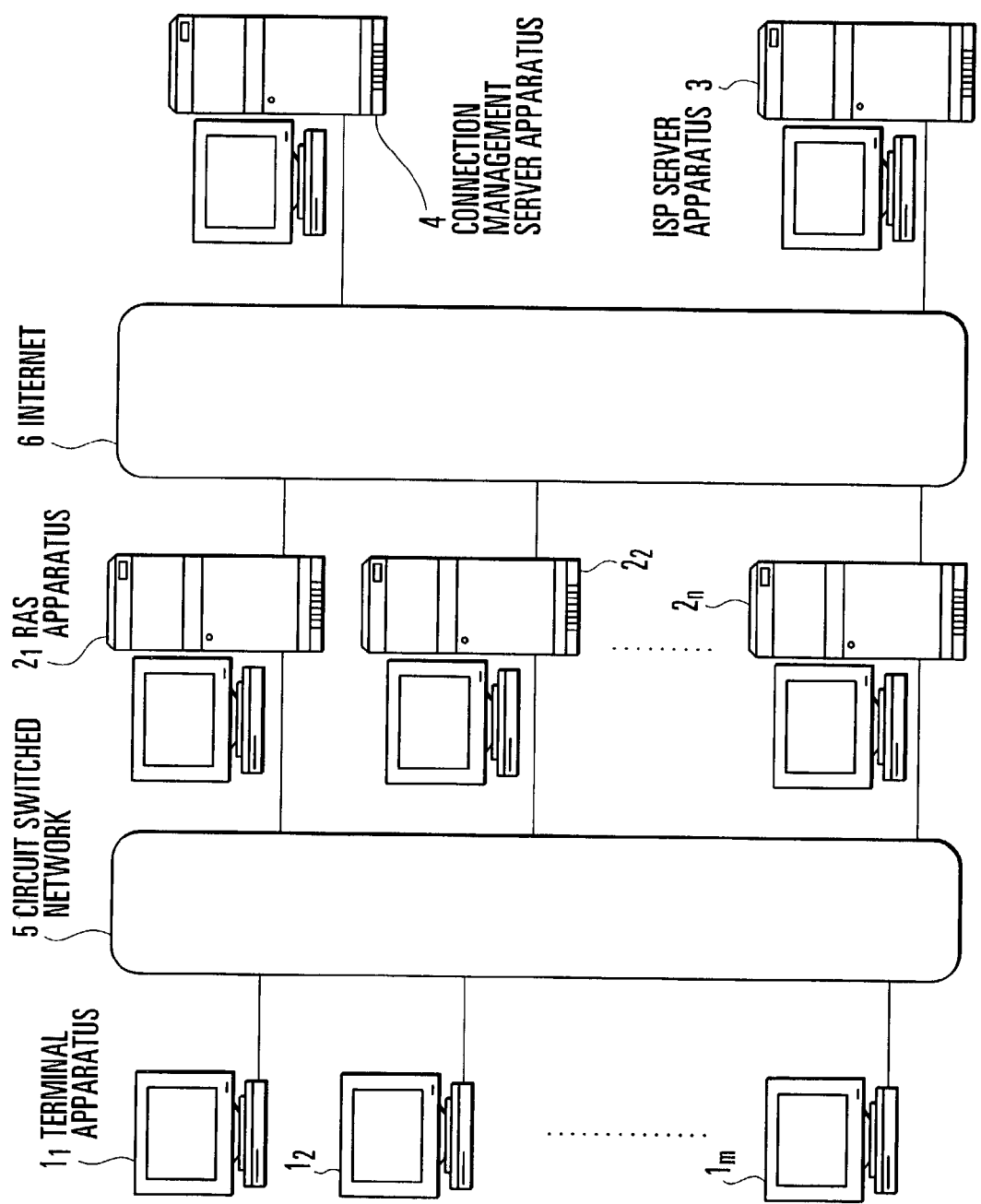
FIG. 1 is a block diagram showing the arrangement of a communication system according to the present invention.
Figure 2:
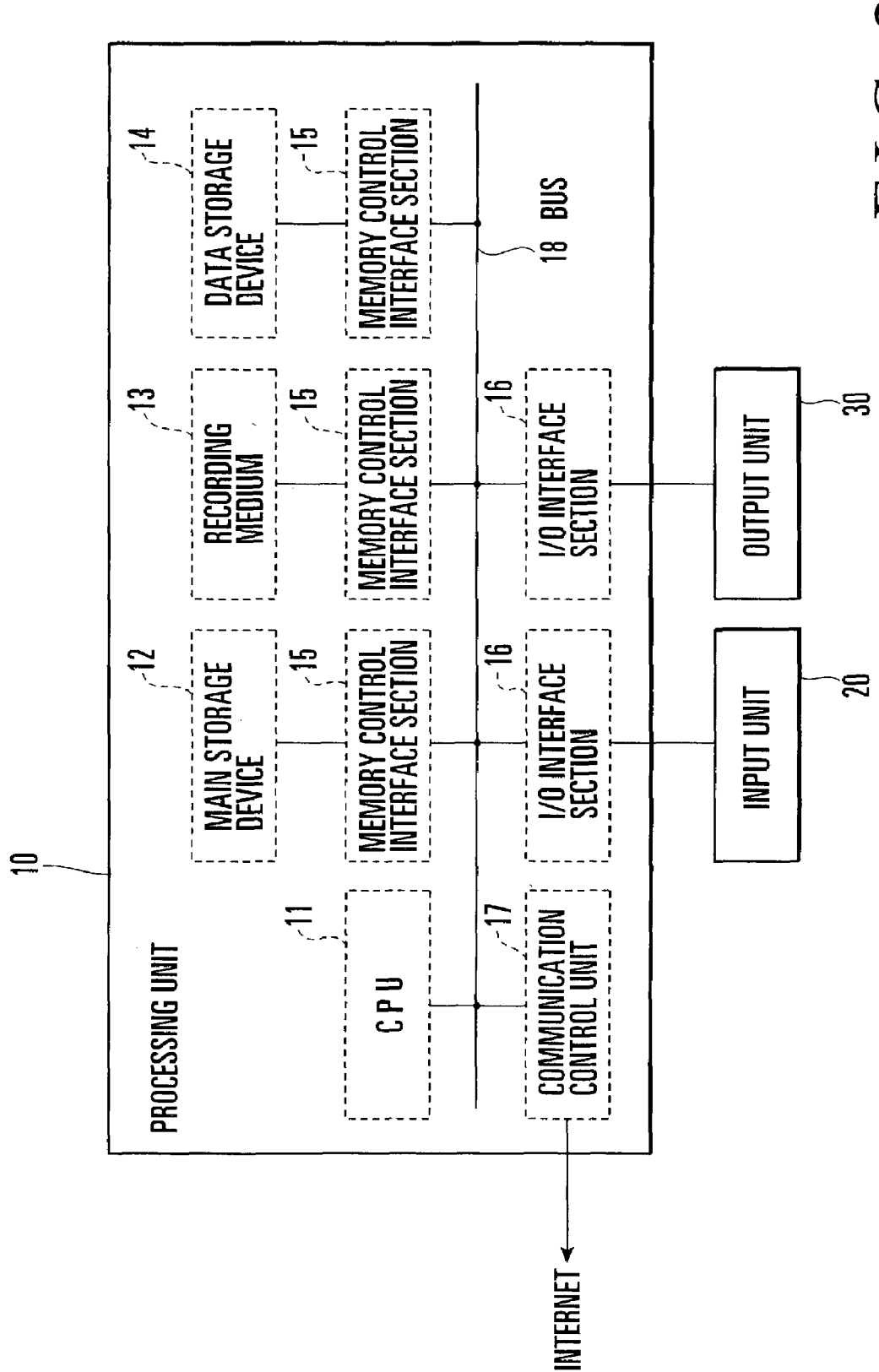
FIG. 2 is a block diagram showing the arrangement of a connection management server apparatus shown in FIG. 1.
Figure 3:
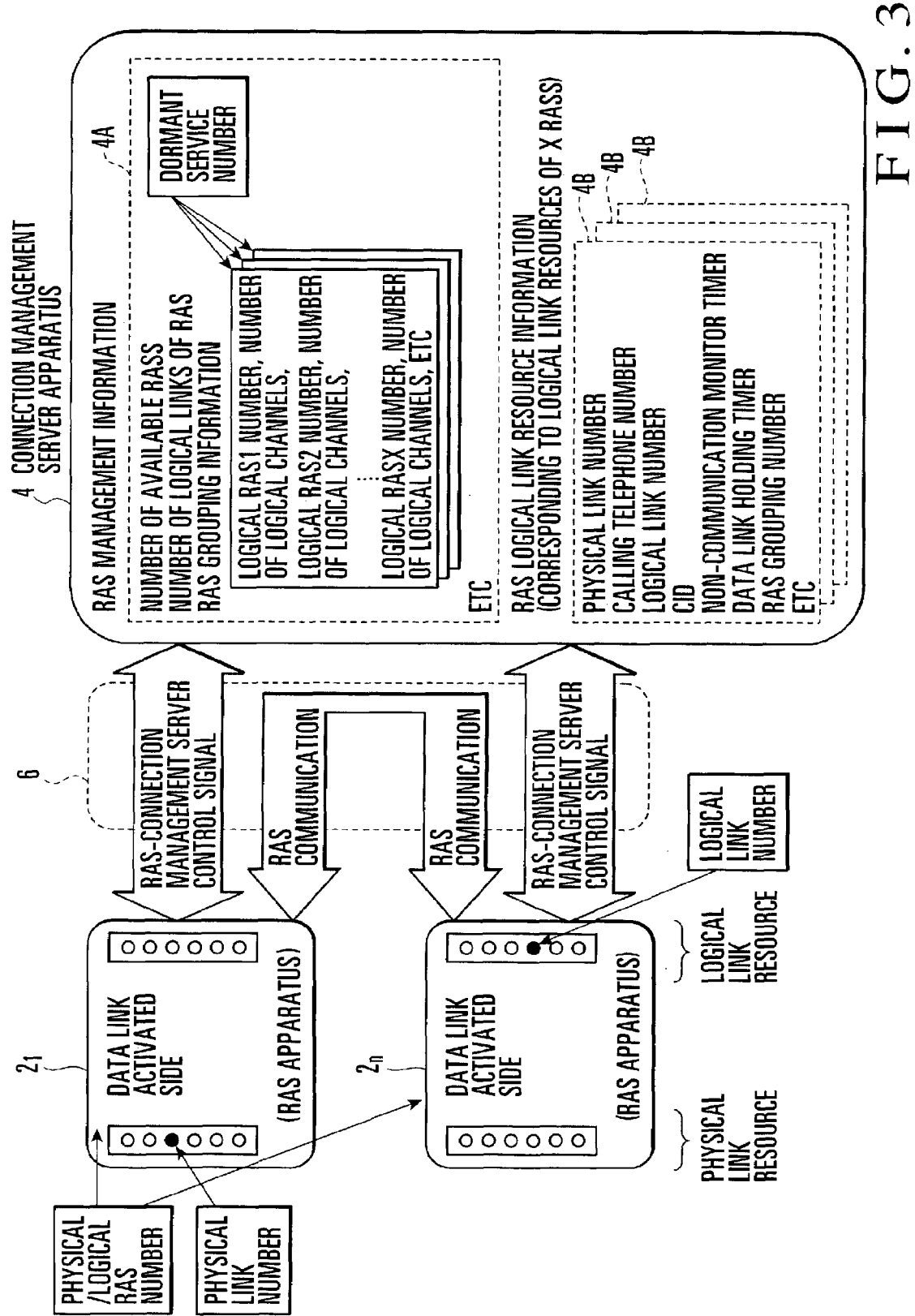
FIG. 3 is a schematic view showing the arrangement of information stored in the data storage unit of the connection management server apparatus shown in FIG. 1.

FIG. 1 shows the arrangement of the communication system according to the present invention. FIG. 2 shows the arrangement of a connection management server apparatus shown in FIG. 1. FIG. 3 shows the arrangement of information stored in the data storage unit of the connection management server apparatus shown in FIG. 1.

As shown in FIG. 1, the communication system of the present invention has a plurality of data link activating side apparatuses $1_1$ to $1_m$, e.g., terminal apparatuses $1_1$ to $1_m$ (m is a positive integer) owned by users who use the Internet, a plurality of data link activated side apparatuses $2_1$ to $2_n$, e.g., RAS apparatuses $2_1$ to $2_n$ (n is a positive integer) connected to the terminal apparatuses $1_1$ to $1_m$ through a circuit switched network 5, a plurality of ISP server apparatuses 3 serving as Web server apparatuses or Mail server apparatuses and connected to the RAS apparatuses $2_1$ to $2_n$ through Internet 6, and a connection management server apparatus 4 which systematically manages the logical link resource of each of the RAS apparatuses $2_1$ to $2_n$.

The RAS apparatuses $2_1$ to $2_n$ and connection management server apparatus 4 may be connected through a LAN (Local Area Network) built by a system administration agent or the like. In the arrangement shown in FIG. 1, one ISP server apparatus 3 is connected to the Internet 6. In fact, a number of ISP server apparatuses 3 are connected to the Internet 6.

Each of the RAS apparatuses $2_1$ to $2_n$, ISP server apparatus 3, and connection management server apparatus 4 is formed from an information processing apparatus such as a workstation or server computer. Each of the terminal apparatuses $1_1$ to $1_m$ is formed from an information processing apparatus such as a personal computer having a connection function to the circuit switched network 5. The connection management server apparatus 4 is managed by the system administration agent that manages the communication system of the present invention or a third party commissioned by the agent to operate the communication system.

Each of the terminal apparatuses $1_1$ to $1_m$ can access the Internet 6 by dialup connection to one of the RAS apparatuses $2_1$ to $2_n$ through the circuit switched network 5. Each of the terminal apparatuses $1_1$ to $1_m$ is connected to the ISP server apparatus 3 through one of the RAS apparatuses $2_1$ to $2_n$.

The RAS apparatuses $2_1$ to $2_n$ relay data to be transmitted/received between the terminal apparatuses $1_1$ to $1_m$ and ISP server apparatus 3 through the circuit switched network 5 and Internet 6 and also execute predetermined dormant management processing according to the above-described MITF dialup dormant protocol. The RAS apparatuses $2_1$ to $2_n$ are put into groups in accordance with, e.g., the number of logical link resources belonging to each apparatus and managed for each group.

As shown in FIG. 2, the connection management server apparatus 4 has a processing unit 10 which executes predetermined processing in accordance with a program, an input unit 20 to be used to input a command or information to the processing unit 10, and an output unit 30 to be used to monitor the processing result of the processing unit 10.

The processing unit 10 has a CPU 11, a main storage device 12 which temporarily stores information necessary for processing of the CPU 11, a recording medium 13 which stores a control program to be used to manage the logical link resources of the RAS apparatuses $2_1$ to $2_n$, a data storage device 14 which stores RAS specific link resource information to be used to manage the logical link resources of the RAS apparatuses $2_1$ to $2_n$ and a RAS management information to be used to manage the states of the RAS apparatuses $2_1$ to $2_n$, memory control interface sections 15 which control data transfer with respect to the main storage device 12, the recording medium 13, and the data storage device 14, I/O interface sections 16 serving as interface devices of the input unit 20 and output unit 30, and a communication control unit 17 serving as an interface which controls communication with the RAS apparatuses $2_1$ to $2_n$. These components are connected through a bus 18.

The processing unit 10 executes the following processing of the connection management server apparatus 4 in accordance with the control program stored in the recording medium 13. The recording medium 13 can be a magnetic disk, semiconductor memory, optical disk, or any other recording medium.

Each of the RAS apparatuses $2_1$ to $2_n$ and ISP server apparatus 3 has the same arrangement as that of the connection management server apparatus 4 except for the program or data stored in the recording medium 13 and data storage device 14. Each of the terminal apparatuses $1_1$ to $1_m$ also basically has the same arrangement as that of the connection management server apparatus 4 except for the program or data stored in the recording medium 13 and data storage device 14, as described above. Hence, a description of the arrangement will be omitted.

As shown in FIG. 3, the data storage device 14 in the processing unit 10 of the connection management server apparatus 4 stores logical link resource information 4B (physical link numbers, calling telephone numbers, logical link numbers, CIDs, non-communication monitor timers, data link holding timers, RAS grouping numbers if the RAS apparatuses $2_1$ to $2_n$ are put into groups in advance, and the like) of the RAS apparatuses $2_1$ to $2_n$ and RAS management information 4A (the number of available RASs, the number of logical links of each RAS, RAS grouping information if the RAS apparatuses $2_1$ to $2_n$ are put into groups in advance, and the like).

The information contained in the logical link resource information 4B will now be described. The physical link numbers are the numbers of modems used to connect the RAS apparatuses $2_1$ to $2_n$ to the terminal apparatuses $1_1$ to $1_m$ through the circuit switched network 5. The calling telephone numbers are telephone numbers used by the terminal apparatuses $1_1$ to $1_m$. The logical link numbers are the numbers of interfaces used to connect the RAS apparatuses $2_1$ to $2_n$ to the ISP server apparatus 3 through the Internet 6. The CIDs are pieces of information defined by ARIB STD-T78, which are uniquely assigned to the respective resources and used for re-calls from the terminal apparatuses $1_1$ to $1_m$ to the RAS apparatuses $2_1$ to $2_n$.

The RAS grouping numbers are numbers assigned to RAS grouping information. The non-communication monitor timers and data link holding timers are timers defined by ARIB STD-T78. The non-communication monitor timer is used in the terminal apparatus 1. The data link holding timer is used in the RAS apparatus 2. The non-communication monitor timer is used to release the physical link resource when a non-communication state is set between the terminal apparatus 1 and the RAS apparatus 2 for a predetermined time. The data link holding timer is used to release a corresponding logical link resource when a dormant state continues for a predetermined time.

In this embodiment, the connection management server apparatus 4 systematically manages the non-communication monitor timers and data link holding timers and supplies optimum values to the RAS apparatuses $2_1$ to $2_n$.

On the other hand, the number of available RASs indicates the number of RAS apparatuses $2_1$ to $2_n$ arranged in the communication system. The number of logical links of each RAS indicates the number of logical link resources of each of the RAS apparatuses $2_1$ to $2_n$. The RAS grouping information is information which contains the logical RAS number and the number of logical channels of each RAS apparatus in each group and is to be used to identify each group to search for a RAS apparatus having a free logical link resource when a called RAS apparatus has no free logical link resource.

Figure 4A:
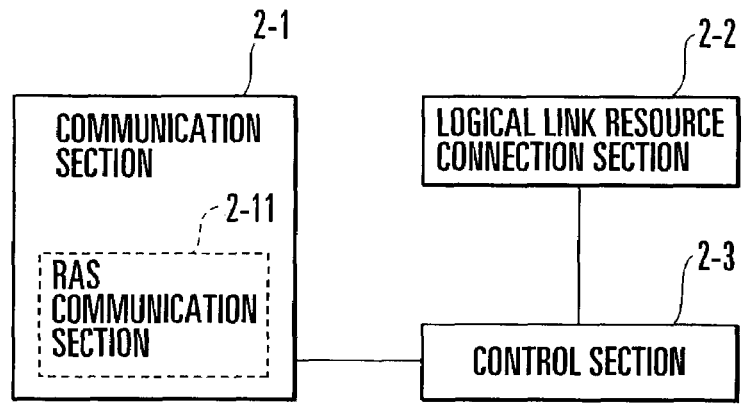
FIG. 4A is a block diagram for explaining a RAS apparatus shown in FIG. 1.
Figure 4B:
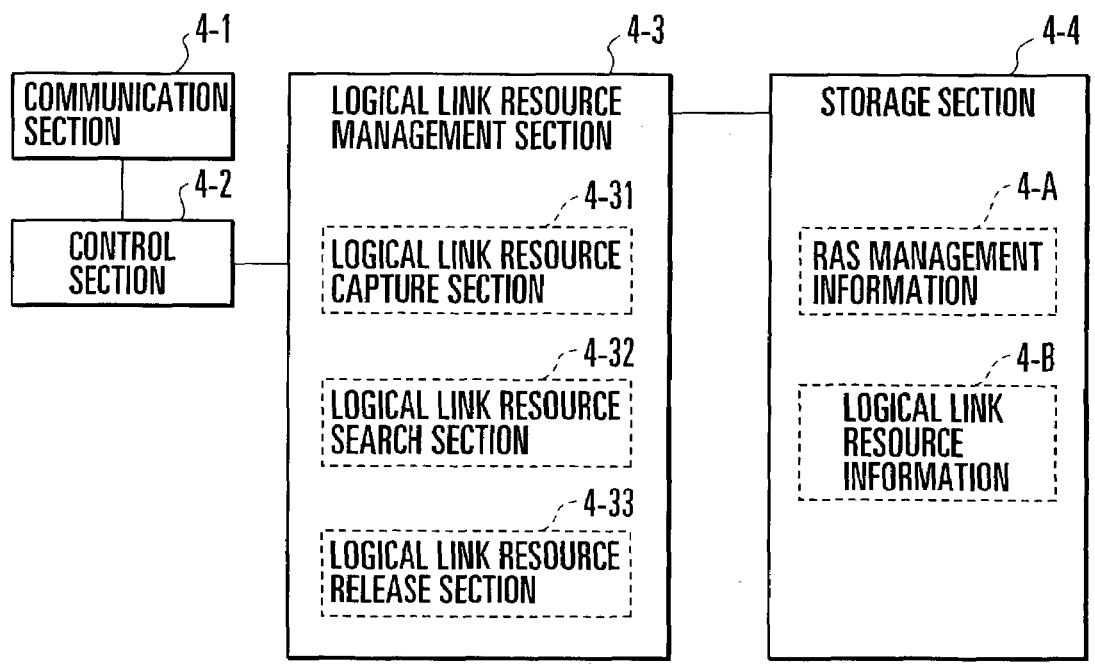
FIG. 4B is a block diagram for explaining the connection management server apparatus shown in FIG. 1.

FIG. 4A explains the RAS apparatus shown in FIG. 1. FIG. 4B explains the connection management server apparatus shown in FIG. 1.

The RAS apparatus comprises a communication section 2-1 which receives a new call from the terminal apparatus 1 through the circuit switched network 5, a logical link resource connection section 2-2 which transmits, in response to the call, a logical link capture request to the connection management server apparatus 4 to ensure a logical link resource, and a control section 2-3 which controls the communication section 2-1 and logical link resource connection section 2-2. The communication section 2-1 has a RAS communication section 2-11 which executes communication between RAS apparatuses (to be described later).

The connection management server apparatus 4 comprises a communication section 4-1 which receives a logical link capture request from the RAS apparatus 2, a logical link resource management section 4-3 which captures a free logical link resource of the RAS apparatus by referring to logical link resource information for each RAS, which is stored in the RAS management information 4A, in response to the received logical link capture request and returns a logical link capture reply containing the information (logical link number) of the captured free logical link resource, a storage section 4-4 which stores the RAS management information 4A and logical link resource information 4B and a control section 4-2 which controls the communication section 4-1 and logical link resource management section 4-3.

The logical link resource management section 4-3 has a logical link resource capture section 4-31 which captures a logical link resource, a logical link resource search section 4-32 which searches for the RAS management information 4A and logical link resource information 4B, and a logical link resource release section 4-33 which releases the logical link resource.

When the terminal apparatus 1 newly calls a RAS apparatus through the circuit switched network 5, the logical link resource connection section 2-2 of the RAS apparatus transmits a logical link capture request to the connection management server apparatus 4 to ensure a logical link resource.

Upon receiving the logical link capture request from the RAS apparatus, the logical link resource management section 4-3 of the connection management server apparatus 4 causes the logical link resource search section 4-32 to capture a free logical link resource of the RAS apparatus by referring to the logical link resource information 4B of each RAS. The logical link resource capture section 4-31 returns a logical link capture reply containing the information (logical link number) of the captured free logical link resource.

Upon receiving the logical link capture reply containing the logical RAS number of the self RAS apparatus, the logical link resource connection section 2-2 of the RAS apparatus relays data communication between the terminal apparatus and the ISP server apparatus 3 using the designated logical link resource.

If the RAS apparatus that has transmitted the logical link capture request has no free logical link resource, the logical link resource search section 4-32 of the connection management server apparatus 4 searches for the RAS management information 4A using the logical RAS number of the RAS apparatus that has transmitted the logical link capture request, refers to the RAS specific logical link resource information of each of the remaining RAS apparatuses belonging to the same group as that of the RAS apparatus, and searches for a free logical link resource in the group. When a free logical link resource is present, the logical link resource capture section 4-31 captures the logical link resource and returns a logical link capture reply containing the information (logical RAS number and logical link number) of the captured free logical link resource.

Upon receiving the logical link capture reply containing the logical RAS number of another RAS apparatus, the logical link resource connection section 2-2 of the RAS apparatus causes the RAS communication section 2-11 to execute RAS communication with the RAS apparatus designated by the logical RAS number so that the data communication between the terminal apparatus and the ISP server apparatus 3 is relayed by the RAS apparatus.

The connection management server apparatus 4 captures a logical link resource with priority over a RAS apparatus that has transmitted a logical link capture request earlier.

The logical link capture request contains information such as a physical link number to be used by the RAS apparatus, the calling telephone number of the terminal apparatus, and the called telephone number of the switching system or RAS apparatus. The logical link capture reply contains a physical link number, calling telephone number, logical RAS number, logical link number, CID, non-communication monitor timer, and data link holding timer.

When the terminal apparatus returns from the dormant state to the active state and re-calls the RAS apparatus through the circuit switched network 5, the logical link resource connection section 2-2 of the RAS apparatus transmits to the connection management server apparatus 4 a logical link search request to search for the logical link resource that was used before the dormant state. The logical link search request transmitted at this time contains the CID (CID in ARIB STD-T78) notified by the logical link capture reply.

When the terminal apparatus in the dormant state should be re-connected to a RAS apparatus, the call is not always received by the RAS apparatus that received the call before the dormant state. Hence, the RAS apparatus to which the terminal apparatus is re-connected acquires from the connection management server apparatus 4 the information of the logical link resource that was used by the terminal apparatus before the dormant state.

Upon receiving the logical link search request from the RAS apparatus, the logical link resource management section 4-3 of the connection management server apparatus 4 causes the logical link resource search section 4-32 to search for RAS specific logical link resource information using the CID (CID in ARIB STD-T78) contained in the logical link search request and extract a logical link resource that coincides with the CID. The logical link resource capture section 4-31 returns a logical link search reply containing the information (logical RAS number and logical link number) of the extracted logical link resource.

When the logical link search reply is received, and the logical RAS number contained in it corresponds to the self RAS apparatus, the logical link resource connection section 2-2 of the RAS apparatus relays data communication between the terminal apparatus and the ISP server apparatus 3 using the logical link resource with the logical link number received by the communication section 2-1. If the logical RAS number contained in the logical link search reply indicates an apparatus other than the self RAS apparatus, the RAS communication section 2-11 executes RAS communication with the RAS apparatus designated by the logical RAS number and relays data communication between the terminal apparatus and the ISP server apparatus 3 through the logical link resource designated by the logical link number.

The logical link search request contains information such as the physical link number to be used by the RAS apparatus, the CID, and the calling telephone number of the terminal apparatus. The logical link search reply contains the physical link number, CID, logical RAS number, logical link number, non-communication monitor timer, and data link holding timer.

When the data communication between the terminal apparatus and the ISP server apparatus 3 is ended, the RAS apparatus transmits to the connection management server apparatus 4 a logical link release request to release the logical link resource used in correspondence with the terminal apparatus.

Upon receiving the logical link release request from the RAS apparatus, the logical link resource release section 4-33 of the connection management server apparatus 4 searches for RAS logical link resource information using the CID (CID in ARIB STD-T78) contained in the logical link release request, updates the state of the logical link resource used by the RAS apparatus to "release", and returns a logical link release reply to release the logical link resource. Actual release of the logical link resource is done on the RAS apparatus side.

The logical link release request contains information such as a signal transmission source identifier (physical link number or logical link number), CID, and the calling telephone number of the terminal apparatus. The logical link release reply contains the signal transmission source identifier.

Table 1 shows various control signals to be transmitted/received between the above-described RAS apparatus and the connection management server apparatus 4 and information contained in the control signals.

TABLE 1

| RAS - Connection Management Server Control Signal | Request (RAS → Server) | Reply (Server → RAS) |
|---|---|---|
| Logical link capture | Physical link number<br>Calling telephone number<br>Called telephone number | Physical link number<br>Calling telephone number<br>Logical RAS number<br>Logical link number<br>CID<br>Non-communication monitor timer<br>Data link holding timer |
| Logical link search | Physical link number<br>CID<br>Calling telephone number | Physical link number<br>CID<br>Logical RAS number<br>Logical link number<br>Non-communication monitor timer<br>Data link holding timer |
| Logical link release | Signal transmission Source identifier<br>CID<br>Calling telephone number | Signal transmission source identifier |

Table 1 shows only basic items. For example, when the traffic information of the Internet 6 is added to the logical link release request, and the information is accumulated in the connection management server apparatus 4, the traffic information of the entire communication system can be managed.

The operation of the communication system according to the present invention will be described next in detail with reference to the accompanying drawings.

The operation of the communication system when the terminal apparatus $1_1$ is newly connected to the RAS apparatus $2_1$, and no RAS communication is executed will be described first. FIG. 5 shows the operation of the communication system when the terminal apparatus shown in FIG. 1 is newly connected to the RAS apparatus, and no RAS communication is executed.

As shown in FIG. 5, when the data link activating side (terminal apparatus $1_1$) newly calls the data link activated side (RAS apparatus $2_1$) through the circuit switched network 5, the RAS apparatus $2_1$ transmits the above-described logical link capture request to the connection management server apparatus 4.

The connection management server apparatus 4 captures a free logical link resource of the RAS apparatus $2_1$ by referring to the RAS specific logical link resource information stored in the data storage device of the connection management server apparatus 4 and returns to the RAS apparatus $2_1$ a logical link capture reply containing the logical link number of the captured free logical link resource. The connection management server apparatus 4 also updates the RAS specific logical link resource information and changes the captured free logical link resource to "busy".

The operation of the communication system when the terminal apparatus $1_1$ is newly connected to the RAS apparatus $2_1$, and RAS communication is executed will be described next. FIG. 6 shows the operation of the communication system when the terminal apparatus shown in FIG. 1 is newly connected to the RAS apparatus, and RAS communication is executed.

As shown in FIG. 6, when the data link activating side (terminal apparatus $1_1$) newly calls the data link activated side (RAS apparatus $2_1$) through the circuit switched network 5, the RAS apparatus $2_1$ transmits the above-described logical link capture request to the connection management server apparatus 4.

The connection management server apparatus 4 captures a free logical link resource by referring to the RAS specific logical link resource information stored in the data storage device of the connection management server apparatus 4 and returns to the RAS apparatus $2_1$ a logical link capture reply containing the logical link number of the captured free logical link resource. The connection management server apparatus 4 also updates the RAS specific logical link resource information and changes the captured free logical link resource to "busy".

Since the RAS apparatus $2_1$ has no free logical link resource, a free logical link resource of the RAS apparatus $2_2$ belonging to the same group as that of the RAS apparatus $2_1$ is captured. In this case, the logical RAS number contained in the logical link capture reply indicates the RAS apparatus $2_2$, the RAS apparatus $2_1$ executes RAS communication with the RAS apparatus $2_2$, accesses the Internet 6 using the free logical link resource of the RAS apparatus $2_2$, and relays data communication between the terminal apparatus $1_1$ and the ISP server apparatus 3.

Figure 7:
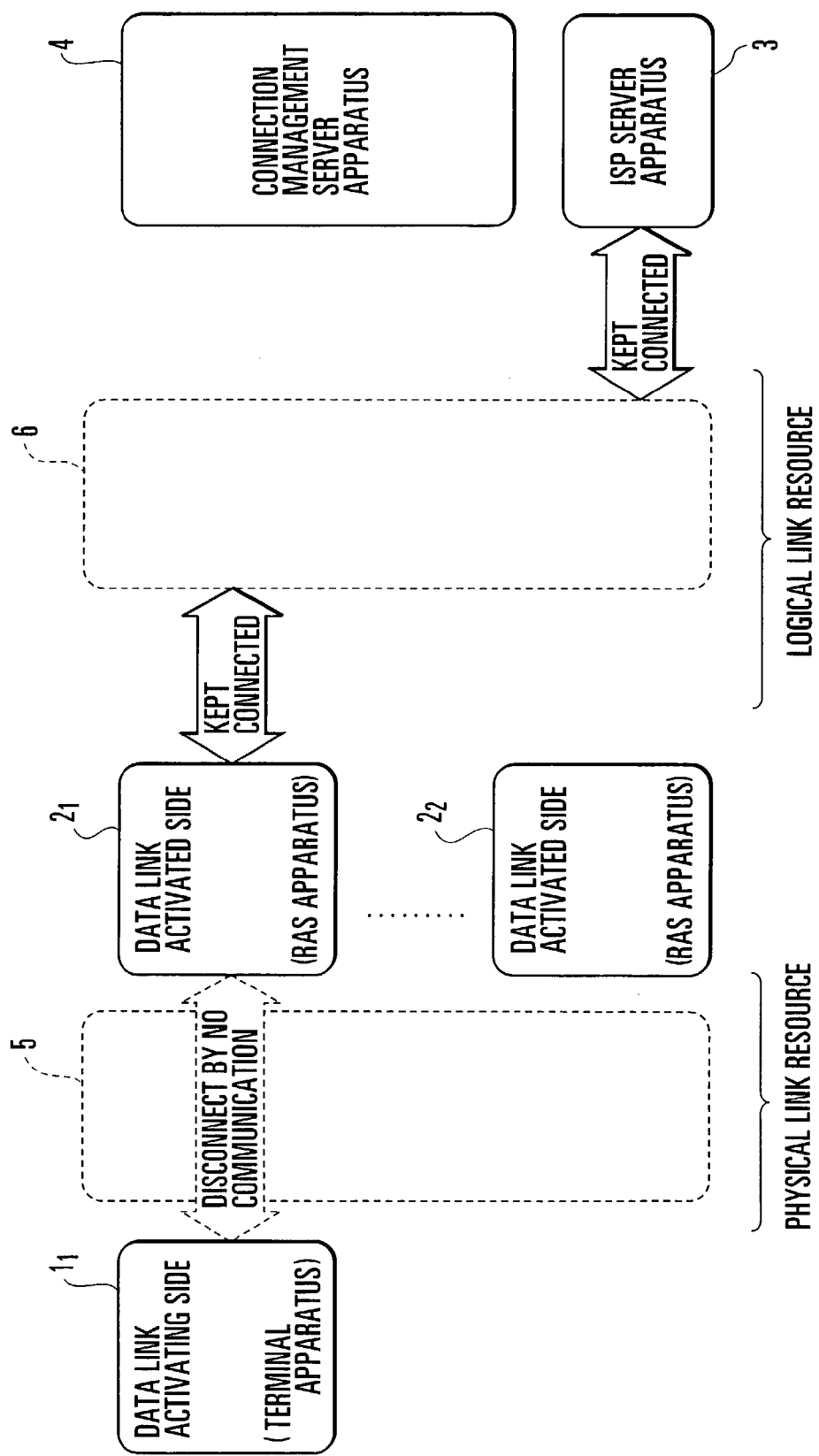
FIG. 7 is a schematic view showing the operation of the communication system when the terminal apparatus shown in FIG. 1 is in a dormant state.

The operation of the communication system when the terminal apparatus $1_1$ is in the dormant state will be described next. FIG. 7 shows the operation of the communication system when the terminal apparatus shown in FIG. 1 is in the dormant state.

As shown in FIG. 7, when transition of the data link activating side (terminal apparatus $1_1$) to the dormant state occurs, the data link activated side (RAS apparatus $2_1$) disconnects the physical link resource between the terminal apparatus $1_1$ and the RAS apparatus $2_1$ while maintaining connection of the logical link resource to the Internet 6.

Figure 8:
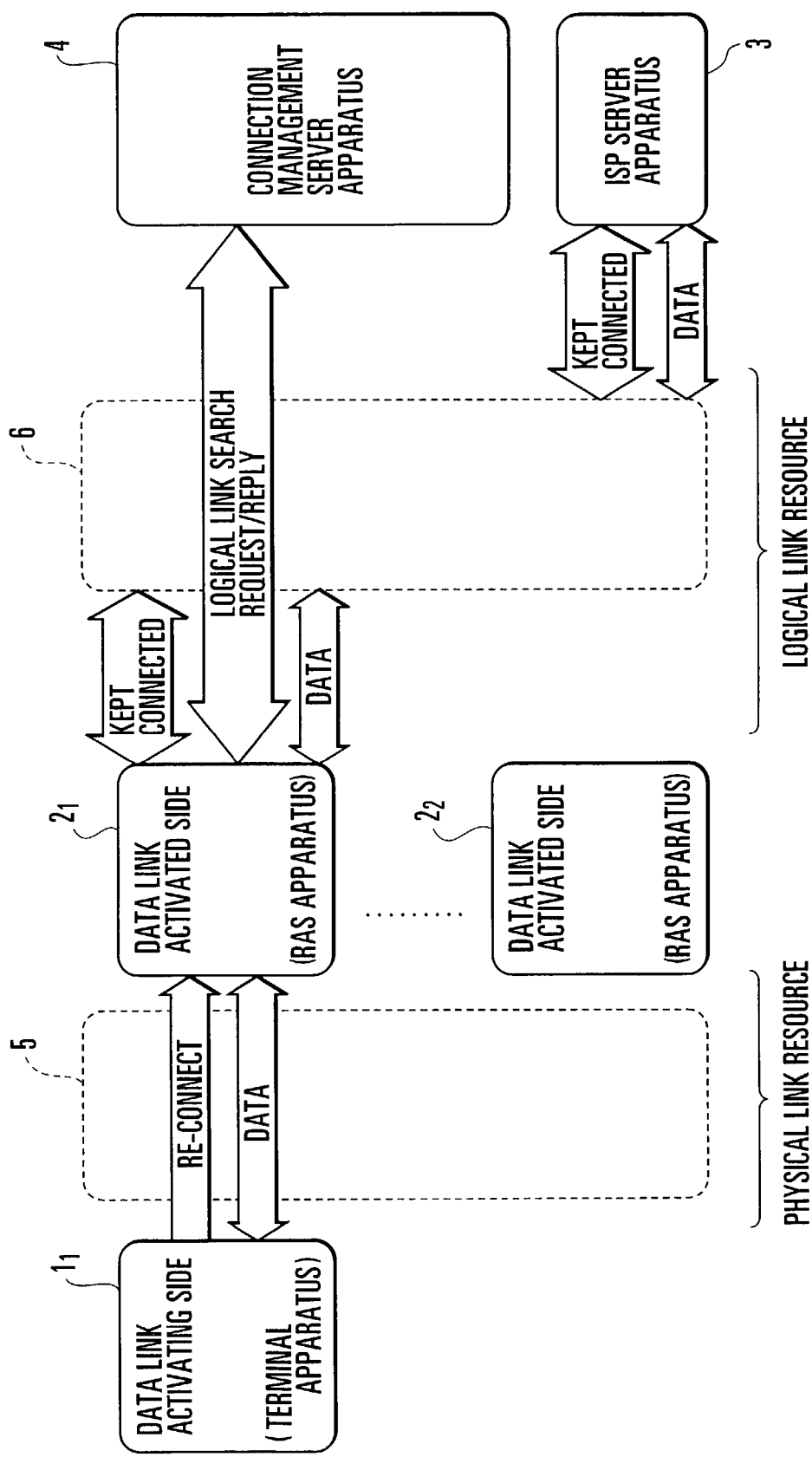
FIG. 8 is a schematic view showing the operation of the communication system when the terminal apparatus shown in FIG. 1 is re-connected to the RAS apparatus, and no RAS communication is executed.

The operation of the communication system when the terminal apparatus $1_1$ is re-connected to the RAS apparatus $2_1$, and no RAS communication is executed will be described next. FIG. 8 shows the operation of the communication system when the terminal apparatus shown in FIG. 1 is re-connected to the RAS apparatus, and no RAS communication is executed.

As shown in FIG. 8, when the data link activating side (terminal apparatus $1_1$) returns from the dormant state to the active state, the terminal apparatus $1_1$ re-calls the data link activated side (RAS apparatus $2_1$) through the circuit switched network 5. Assume here that the terminal apparatus $1_1$ re-calls the RAS apparatus $2_1$ which was called before the dormant state.

At this time, the RAS apparatus $2_1$ transmits the above-described logical link search request to the connection management server apparatus 4.

The connection management server apparatus 4 searches for the RAS specific logical link resource information stored in the data storage device using the CID that is transmitted together with the logical link search request and returns to the RAS apparatus $2_1$ a logical link search reply containing a logical link number corresponding to the logical link resource that coincides with the CID.

The RAS apparatus $2_1$ resumes relay of data communication between the terminal apparatus $1_1$ and the ISP server apparatus 3 using the logical link resource of the self apparatus, which is designated by the logical link number contained in the logical link search reply.

Figure 9:
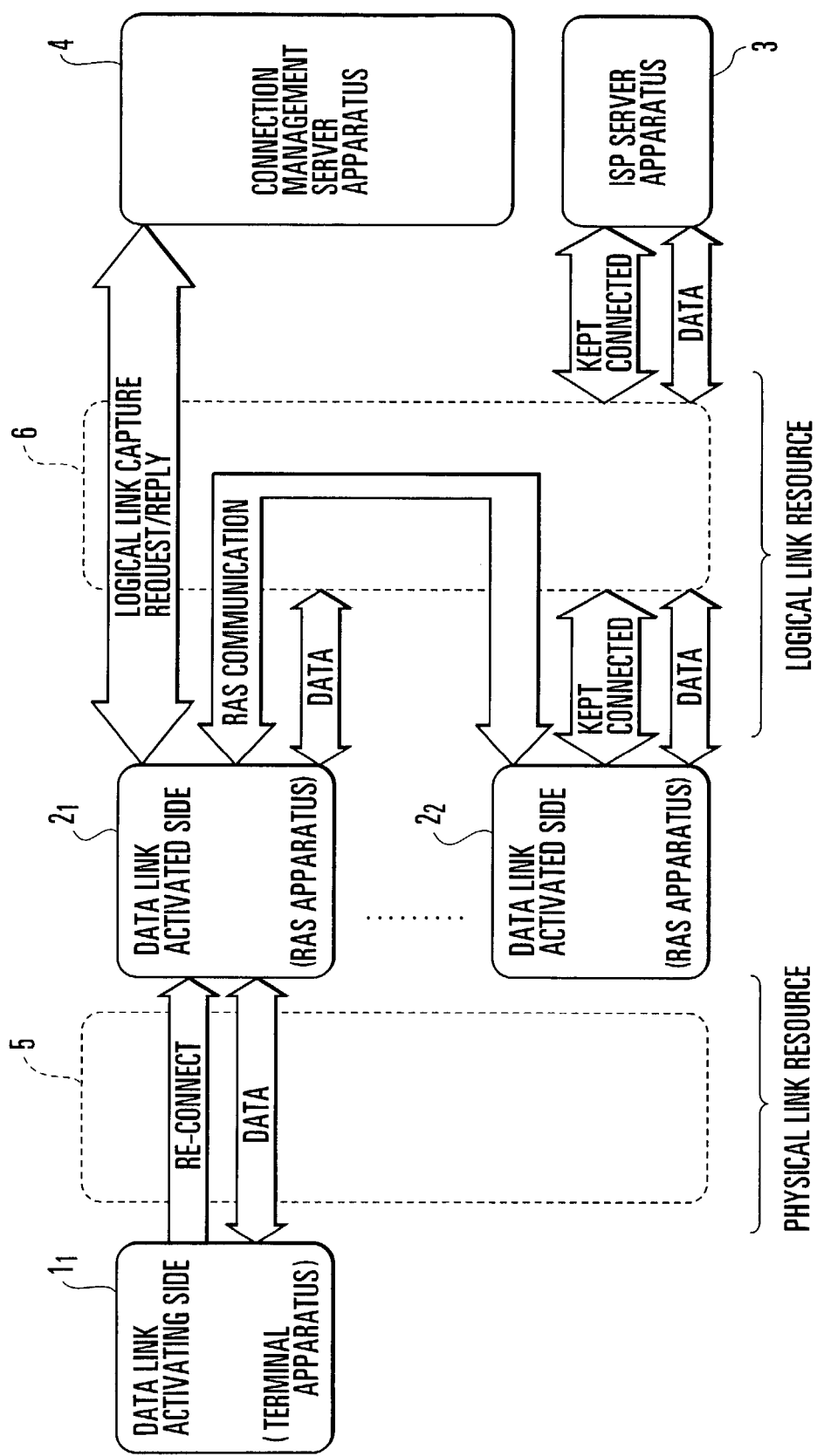
FIG. 9 is a schematic view showing the operation of the communication system when the terminal apparatus shown in FIG. 1 is re-connected to the RAS apparatus, and RAS communication is executed.

The operation of the communication system when the terminal apparatus $1_1$ is re-connected to the RAS apparatus $2_1$, and RAS communication is executed will be described next. FIG. 9 shows the operation of the communication system when the terminal apparatus shown in FIG. 1 is re-connected to the RAS apparatus, and RAS communication is executed.

As shown in FIG. 9, when the terminal apparatus $1_1$ returns from the dormant state to the active state, the terminal apparatus $1_1$ re-calls the data link activated side (RAS apparatus $2_1$) through the circuit switched network 5. Assume here that the terminal apparatus $1_1$ re-calls the RAS apparatus $2_2$ which was not called before the dormant state.

At this time, the RAS apparatus $2_2$ transmits the above-described logical link search request to the connection management server apparatus 4.

The connection management server apparatus 4 searches for the RAS specific logical link resource information stored in the data storage device using the CID that is transmitted together with the logical link search request and returns to the RAS apparatus $2_2$ a logical link search reply containing a logical RAS number and logical link number corresponding to the logical link resource that coincides with the CID.

Since the logical RAS number contained in the logical link search reply indicates the RAS apparatus $2_1$, the RAS apparatus $2_2$ executes RAS communication with the RAS apparatus $2_1$, accesses the Internet 6 using the logical link resource designated by the logical link number of the RAS apparatus $2_1$, and relays data communication between the data link activating side (terminal apparatus $1_1$) and the ISP server apparatus 3.

Figure 10:
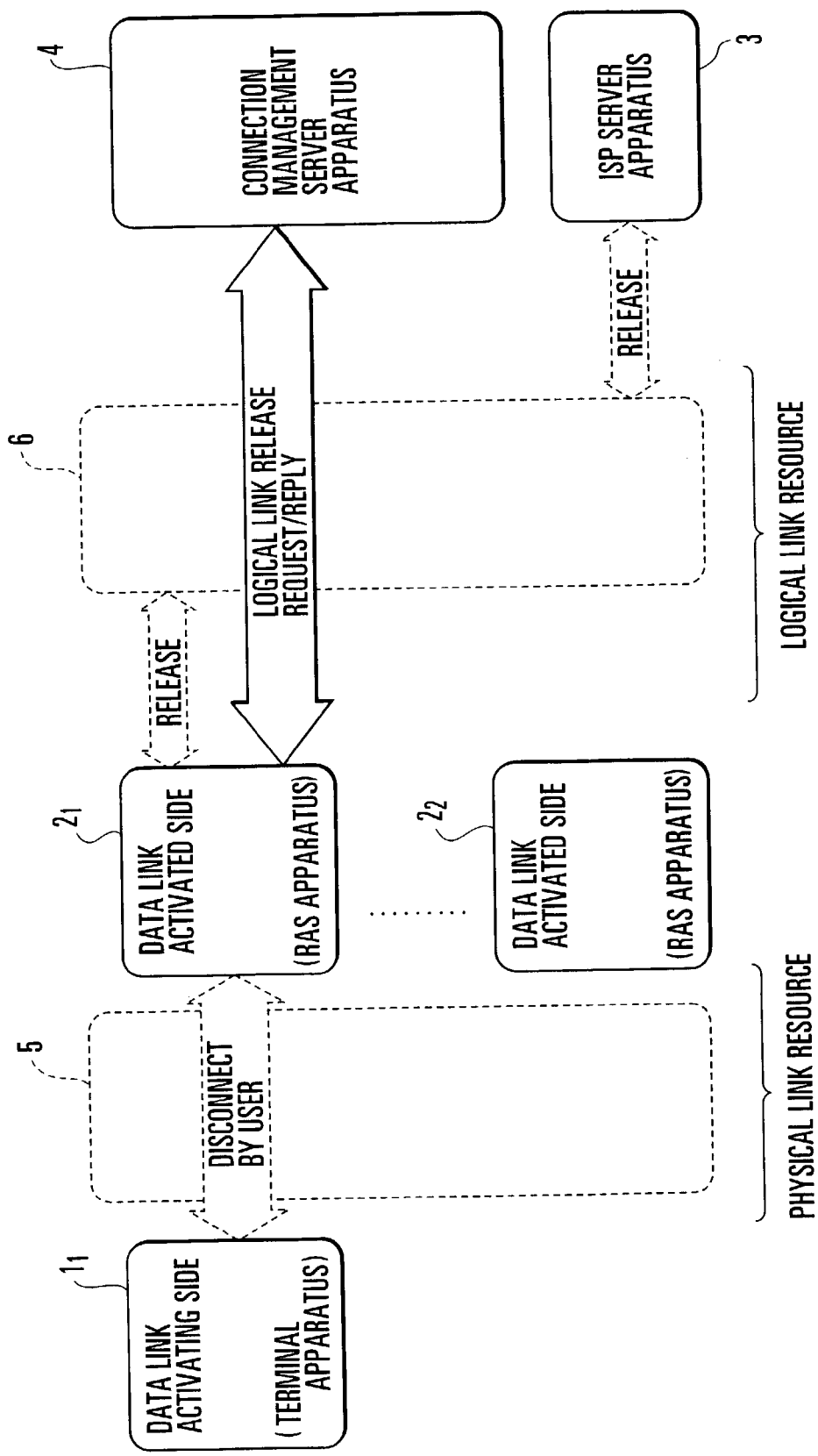
FIG. 10 is a schematic view showing the operation of the communication system when the terminal apparatus shown in FIG. 1 ends data communication.

Finally, the operation of the communication system when the terminal apparatus 1 ends data communication will be described. FIG. 10 shows the operation of the communication system when the terminal apparatus shown in FIG. 1 ends data communication.

As shown in FIG. 10, when data communication between the data link activating side (terminal apparatus $1_1$) and the ISP server apparatus 3 is ended, the RAS apparatus $2_1$ transmits a logical link release request to the connection management server apparatus 4 in response to a line disconnection request from the terminal apparatus $1_1$.

Upon receiving the logical link release request from the RAS apparatus $2_1$, the connection management server apparatus 4 searches for the RAS specific logical link resource information stored in the data storage device using the CID contained in the logical link release request and updates the logical link resource corresponding to the CID to "release". In addition, the connection management server apparatus 4 returns a logical link release reply to the RAS apparatus $2_1$ to cause it to release the logical link resource. THE RAS apparatus $2_1$ releases the logical link resource connected to the ISP server apparatus 3.

As described above, according to the communication system of the present invention, even when the terminal apparatus calls a RAS apparatus having no free logical link resource, the terminal apparatus can be connected to the Internet through a RAS apparatus having a free logical link resource on the basis of information provided from the connection management server apparatus 4. Hence, the call-loss rate after introduction of the dormant function can greatly be reduced.

In addition, since a plurality of RAS apparatuses are put into groups, the logical link resources and various kinds of timers are managed for each group, and the logical link resources are shared in each group, the number of call losses due to a shortage of logical link resources of a RAS apparatus can be decreased. Especially, when a plurality of RAS apparatuses having relatively small-scale logical link resources are put into a group, a line accommodation capability equivalent to that of a RAS apparatus having large-scale logical link resources can be implemented.

When the information stored in the connection management server apparatus 4 is used, for example, the connection situation on the data link activating side can be displayed. In addition, a specific call that the system administrator wants to release, for example, an unpaid call or a call that is kept connected for a long time can be disconnected.

The present invention having the above-described arrangement has the following effects.

The communication system has a connection management server apparatus which systematically manages the information of logical link resources of each of the plurality of data link activated side apparatuses, when a data link activating side apparatus newly calls a data link activated side apparatus, provides information representing a free logical link resource and a data link activated side apparatus having the logical link resource to the data link activated side apparatus newly called, and when the data link activating side apparatus which returns from a dormant state to an active state newly calls the data link activated side apparatus, provides information representing a logical link resource that was ensured in correspondence with the data link activating side apparatus before the data link activating side apparatus is set in the dormant state and a data link activated side apparatus having the logical link resource to the data link activated side apparatus that is newly called. With this arrangement, even when the data link activating side apparatus calls a data link activated side apparatus having no free logical link resource, the data link activating side apparatus can be connected to the Internet through a data link activated side apparatus having a free logical link resource on the basis of information provided from the connection management server apparatus. Hence, the call-loss rate after introduction of the dormant function can greatly be reduced.

In addition, since a plurality of data link activated side apparatuses are put into groups. When the data link activating side apparatus newly calls a data link activated side apparatus, and the data link activated side apparatus has no free logical link resource, information that represents a free logical link resource in the same group as that of the data link activated side apparatus that is newly called and the data link activated side apparatus having the logical link resource is provided to the data link activated side apparatus that is newly called. Since the logical link resources can be shared in the group, the number of call losses due to a shortage of logical link resources of a data link activated side apparatus can be decreased.

Especially, when a plurality of data link activated side apparatuses having relatively small-scale logical link resources are put into a group, a line accommodation capability equivalent to that of a data link activated side apparatus having large-scale logical link resources can be implemented.

What is claimed is:

1. A communication system comprising:
a plurality of data link activating side apparatuses serving as terminal apparatuses of users who use Internet via a dialup connection;
a plurality of data link activated side apparatuses which are connected to said data link activating side apparatuses through a circuit switched network to relay data to be transmitted/received between said data link activating side apparatuses and an Internet Service Provider for the dialup connection to the Internet; and
a connection management server apparatus which is arranged for said plurality of data link activated side apparatuses to systematically manage information of logical link resources to be used to connect the Internet via the Internet Service Provider, and which, when one of said data link activating side apparatuses that has previously used one of the logical link resources, but which has subsequently gone into a dormant state, freeing the previously-used logical link resource, newly calls one of said data link activated side apparatuses, performs a logical link search request that provides information that represents a free logical link resource to said data link activated side apparatus that is newly called, the free logical link resource being that which was used before entry into the dormant state.

2. The system according to claim 1, wherein upon receiving information of said data link activated side apparatus and information of the logical link resource from said connection management server apparatus, said data link activated side apparatus is connected to the Internet using the logical link resource.

3. The system according to claim 1, wherein said connection management server apparatus comprises:
storage means which stores, said plurality of data link activated side apparatuses which are input into groups,
logical link resource search means for, when said data link activated side apparatus newly called has no free logical link resource, searching for information representing a free logical link resource of a data link activated side apparatus in the same group as that of said data link activated side apparatus, and
logical link resource capture means for providing the information found by said logical link resource search means to said data link activated side apparatus newly called.

4. The system according to claim 3, wherein
when said data link activating side apparatus re-calls said data link activated side apparatus, said logical link resource connection means transmits to said connection management server apparatus a logical link search request containing information representing a physical link resource and a Connection Identifier (CID), and
said logical link resource capture means returns to said data link activated side apparatus a logical link capture reply containing information representing a physical link resource, a free logical link resource, information representing a data link activated side apparatus having the free logical link resource, the CID, a value of a non-communication monitor timer, and a value of a data link holding timer.

5. The system according to claim 1, wherein said connection management server apparatus comprises logical link resource release means for, when data communication between said data link activating side apparatus and the Internet is ended, releasing the logical link resource used by said data link activated side apparatus in correspondence with said data link activating side apparatus in response to a request from said data link activated side apparatus.

6. The system according to claim 1, wherein
said data link activated side apparatus comprises logical link resource connection means for, when newly called by said data link activating side apparatus, for transmitting to said connection management server apparatus a logical link capture request containing information representing a physical link resource to be used to connect said data link activating side apparatus through the circuit switched network, and
said connection management server apparatus comprises logical link resource capture means for returning to said data link activated side apparatus a logical link capture reply containing information representing a physical link resource, a free logical link resource, information representing a data link activated side apparatus having the free logical link resource, a Connection Identifier (CID) serving as information to be used for a re-call from said data link activating side apparatus to said data link activated side apparatus, a value of a non-communication monitor timer to release the physical link resource when a non-communication state continues between said data link activating side apparatus and said data link activated side apparatus for a predetermined time, and a value of a data link holding timer to release a corresponding logical link resource when a dormant state continues for a predetermined time.

7. A connection management server apparatus comprising:
a data storage device having storage means for storing information of logical link resources of a plurality of data link activated side apparatuses, which are to be used to connect via a dialup connection to an Internet Service Provider connected to the Internet; and
a processing unit having logical link resource management means for, when a data link activating side apparatus that has previously used one of the logical link resources, but which has subsequently gone into a dormant state, freeing the previously-used logical link resource, newly calls a data link activated side apparatus, providing, by performing a logical link search request, to the data link activated side apparatus that is newly called, information that represents a free logical link resource to the newly called data link activated side apparatus, the free logical link resource being that which was used before entry into the dormant state.

8. The apparatus according to claim 7, wherein said logical link resource management means comprises:
logical link resource search means for, when the data link activated side apparatus newly called in the plurality of data link activated side apparatuses put into groups has no free logical link resource, searching for information representing a free logical link resource of a data link activated side apparatus in the same group as that of the data link activated side apparatus, and
logical link resource capture means for providing the information found by said logical link resource search means to the data link activated side apparatus newly called.

9. The apparatus according to claim 7, wherein said logical link resource management means comprises logical link resource release means for, when data communication between the data link activating side apparatus and the Internet is ended, releasing the logical link resource used by the data link activated side apparatus in correspondence with the data link activating side apparatus in response to a request from the data link activated side apparatus.

10. The apparatus according to claim 7, wherein upon receiving from the data link activated side apparatus a logical link capture request containing information representing a physical link resource to be used to connect the data link activating side apparatus through a circuit switched network, said logical link resource management means returns a logical link capture reply containing information representing a physical link resource, a free logical link resource, information representing a data link activated side apparatus having the free logical link resource, a Connection Identifier (CID) serving as information to be used for a re-call from the data link activating side apparatus to the data link activated side apparatus, a value of a non-communication monitor timer to release the physical link resource when a non-communication state continues between the data link activating side apparatus and the data link activated side apparatus for a predetermined time, and a value of a data link holding timer to release a corresponding logical link resource when a dormant state continues for a predetermined time.

11. The apparatus according to claim 10, wherein
upon receiving from the data link activated side apparatus a logical link search request containing information representing a physical link resource and a CID, said logical link resource management means returns a logical link capture reply containing information representing a physical link resource, a free logical link resource, information representing a data link activated side apparatus having the free logical link resource, the CID, a value of a non-communication monitor timer, and a value of a data link holding timer.

12. A recording medium which stores a program which causes a computer to execute processing of managing a dormant function of a communication system comprising
a plurality of data link activating side apparatuses serving as terminal apparatuses of users who use Internet via a dialup connection, and
a plurality of data link activated side apparatuses which are connected to the data link activating side apparatuses through a circuit switched network to relay data to be transmitted/received between the data link activating side apparatuses and an Internet Service Provider for dialup connection to the Internet, wherein the program comprises a program which causes the computer to execute:
a function of systematically managing information of logical link resources to be used to connect the Internet via the Internet Service Provider, such that when one of the data link activating side apparatuses that has previously used one of the logical link resources, but which has subsequently gone into a dormant state, freeing the previously-used logical link resource, newly calls one of the data link activated side apparatuses, providing, by performing a logical link search request, information that represents a free logical link resource and a data link activated side apparatus having the logical link resource to the data link activated side apparatus that is newly called; and
a function of, when the data link activating side apparatus which returns from a dormant state to an active state newly calls the data link activated side apparatus, providing to the data link activated side apparatus that is newly called information that represents a logical link resource that corresponds with the data link activating side apparatus before the data link activating side apparatus was set in the dormant state and represents a data link activated side apparatus having the logical link resource.

13. The medium according to claim 12, wherein the program comprises a program which causes the computer to execute:
a function of putting the plurality of data link activated side apparatuses into groups, and when the data link activated side apparatus newly called has no free logical link resource, searching for information representing a free logical link resource of a data link activated side apparatus in the same group as that of the data link activated side apparatus, and
a function of providing the information found by the logical link resource search to the data link activated side apparatus newly called.

14. The medium according to claim 12, wherein the program comprises a program which causes the computer to execute a function of, when data communication between the data link activating side apparatus and the Internet is ended, releasing the logical link resource used by the data link activated side apparatus in correspondence with the data link activating side apparatus in response to a request from the data link activated side apparatus.

15. The medium according to claim 12, wherein the program comprises a program which causes the computer to execute a function of, upon receiving from the data link activated side apparatus a logical link capture request containing information representing a physical link resource to be used to connect the data link activating side apparatus through the circuit switched network, returning a logical link capture reply containing information representing a physical link resource, a free logical link resource, information representing a data link activated side apparatus having the free logical link resource, a CID serving as information to be used for a re-call from the data link activating side apparatus to the data link activated side apparatus, a value of a non-communication monitor timer to release the physical link resource when a non-communication state continues between the data link activating side apparatus and the data link activated side apparatus for a predetermined time, and a value of a data link holding timer to release a corresponding logical link resource when the dormant state continues for a predetermined time.

16. The medium according to claim 12, wherein the program comprises a program which causes the computer to execute a function of, upon receiving from the data link activated side apparatus a logical link search request containing information representing a physical link resource and a CID, returning a logical link capture reply containing information representing a physical link resource, a free logical link resource, information representing a data link activated side apparatus having the free logical link resource, the CID, a value of a non-communication monitor timer, and a value of a data link holding timer.

* * * * *